(12) United States Patent  (10) Patent No.: US 8,202,573 B2
Pokorny et al.  (45) Date of Patent: Jun. 19, 2012

(54) SELF-ASSEMBLING ANTIREFLECTIVE COATING COMPRISING SURFACE MODIFIED HIGH REFRACTIVE INDEX NANOPARTICLES

(75) Inventors: Richard J. Pokorny, Maplewood, MN (US); Thomas P. Klun, Lakeland, MN (US); Marc D. Radcliffe, Newport, MN (US); Robert F. Kamrath, Mahtomedi, MN (US); Christopher B. Walker, Jr., St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 306 days.

(21) Appl. No.: 12/670,124

(22) PCT Filed: Sep. 2, 2008

(86) PCT No.: PCT/US2008/074988
§ 371 (c)(1),
(2), (4) Date: Jan. 22, 2010

(87) PCT Pub. No.: WO2009/035874
PCT Pub. Date: Mar. 19, 2009

(65) Prior Publication Data
US 2010/0189970 A1  Jul. 29, 2010

Related U.S. Application Data

(60) Provisional application No. 60/970,541, filed on Sep. 7, 2007.

(51) Int. Cl.
C09D 163/00 (2006.01)
C09D 171/00 (2006.01)
C09D 201/00 (2006.01)
B05D 7/00 (2006.01)
B05D 5/06 (2006.01)

(52) U.S. Cl. ........ 427/162; 427/212; 106/634; 106/638; 106/642

(58) Field of Classification Search .................. None
See application file for complete search history.

(56) References Cited

U.S. PATENT DOCUMENTS

| 6,605,229 | B2 | 8/2003 | Steiner et al. |
| 6,660,389 | B2 | 12/2003 | Liu et al. |
| 6,737,145 | B1 | 5/2004 | Watanabe et al. |
| 7,060,737 | B2 * | 6/2006 | Yamaguchi et al. ............ 522/77 |
| 7,125,926 | B2 | 10/2006 | Satoh et al. |
| 7,615,283 | B2 | 11/2009 | Radcliffe et al. |
| 7,655,298 | B2 | 2/2010 | Thies et al. |

(Continued)

FOREIGN PATENT DOCUMENTS

JP  6-211945  8/1994

(Continued)

OTHER PUBLICATIONS

International Search Report PCT/US2008/074988, Jan. 26, 2009.

(Continued)

*Primary Examiner* — David Sample
*Assistant Examiner* — Nicole Gugliotta
(74) *Attorney, Agent, or Firm* — Carolyn A. Fischer

(57) ABSTRACT

Presently described are self-assembling antireflective ("AR") coating compositions comprising high refractive index surface modified nanoparticles. Also described are various articles such as protective films, optical displays, and windows, comprising such (e.g. dried and cured) AR coating.

13 Claims, 3 Drawing Sheets

U.S. PATENT DOCUMENTS

| | | |
|---|---|---|
| 2005/0158558 A1 | 7/2005 | Hayashida et al. |
| 2006/0074172 A1 | 4/2006 | Yang et al. |
| 2007/0286993 A1* | 12/2007 | Radcliffe et al. ............. 428/212 |
| 2007/0286994 A1 | 12/2007 | Walker et al. |

FOREIGN PATENT DOCUMENTS

| | | |
|---|---|---|
| JP | 2000-301053 | 10/2000 |
| WO | WO 2006/030721 | 3/2006 |
| WO | WO 2007/146509 | 12/2007 |
| WO | WO 2009/117029 | 9/2009 |

OTHER PUBLICATIONS

Neuman, G.A., Anti-Reflective Coatings by APCVD Using Graded Index Layers; Journal of Non-Crystalline Solids 218 (1997) 92-99.

Polymer Handbook; 4th Ed., © 1999, pp. 526-533—Brandrup et al.

* cited by examiner

US 8,202,573 B2

SELF-ASSEMBLING ANTIREFLECTIVE COATING COMPRISING SURFACE MODIFIED HIGH REFRACTIVE INDEX NANOPARTICLES

CROSS REFERENCE TO RELATED APPLICATIONS

This application is a national stage filing under 35 U.S.C. §371 of PCT/US2008/074988, filed Sep. 2, 2008, which claims the benefit of U.S. Provisional Application No. 60/970,541, filed Sep. 7, 2007, the disclosure of which is incorporated by reference in its entirety herein.

BACKGROUND

Various antireflective ("AR") polymer films have been described. AR films are often constructed of alternating high and low refractive index ("RI") polymer layers of the correct optical thickness. With regards to visible light, this thickness is on the order of one-quarter of the wavelength of the light to be reflected. The human eye is most sensitive to light around 550 nm. Therefore it is desirable to design the low and high index coating thicknesses in a manner that minimizes the amount of reflected light in this optical range (e.g. 3% or lower).

In one assembly, a high refractive index (e.g. hardcoat) is applied to (an optionally primed) light transmissible substrate such as PET. A low refractive index layer is applied concurrently or sequentially to the high refractive index layer.

Alternatively, however, AR coatings can be prepared from a coating composition that separates or self-assembles into layers of differing refractive index. See for example U.S. Pat. Nos. 6,605,229 (Steiner et al.), 6,737,145 (Watanabe et al.), U.S. Pat. No. 7,125,926 (Satoh et al.) and US 2006/0074172 (Yang et al.).

SUMMARY OF THE INVENTION

In one embodiment, a self-assembling AR coating composition is described comprising a (e.g. non-fluorinated organic) solvent; a low refractive index organic composition having a refractive index of less than 1.5 and a low surface tension; and at least 15 wt-% of inorganic nanoparticles having a refractive index of at least 1.6 wherein the inorganic nanoparticles are surface modified with a surface treatment having a surface tension greater than the surface tension of the organic composition.

In another embodiment, a method of making an AR film is described comprising providing a self-assembling AR coating composition as described herein; coating the composition onto a substrate or release liner; drying the coating such that the coating composition separates into a low refractive index layer, a gradient layer, and a high refractive index layer; and curing the dried coating composition. The dried coating composition is preferably subsequently cured by exposure to ultraviolet radiation.

Also described are AR films comprising a low refractive index layer comprising a crosslinked fluorinated organic material; and a high refractive index layer comprising surface modified inorganic nanoparticles having a refractive index of at least 1.6 dispersed in a crosslinked organic material. In some embodiments, the AR film can be distinguished from other self-assembling AR film by the presence of an interface rather than a gradient layer between the low refractive index layer and high refractive index layer. In some embodiments, the AR film can be distinguished from a 2-layer AR film by the high refractive index layer comprises atomic fluorine at a concentration ranging from 0.5 atomic wt-% about 5 atomic wt-% and/or the low refractive index layer comprises randomly distributed agglomerates of the surface modified inorganic nanoparticles having a refractive index of at least 1.6.

In each of these embodiments, the self-assembling AR coating composition, method, or AR film may have any one or any combination of various attributes as described herein.

DETAILED DESCRIPTION OF PREFERRED EMBODIMENTS OF THE INVENTION

Presently described are self-assembling antireflective ("AR") coating compositions. Also described are various articles, such as optical displays and windows, that comprise such (e.g. dried and cured) AR coating.

Figure 1:
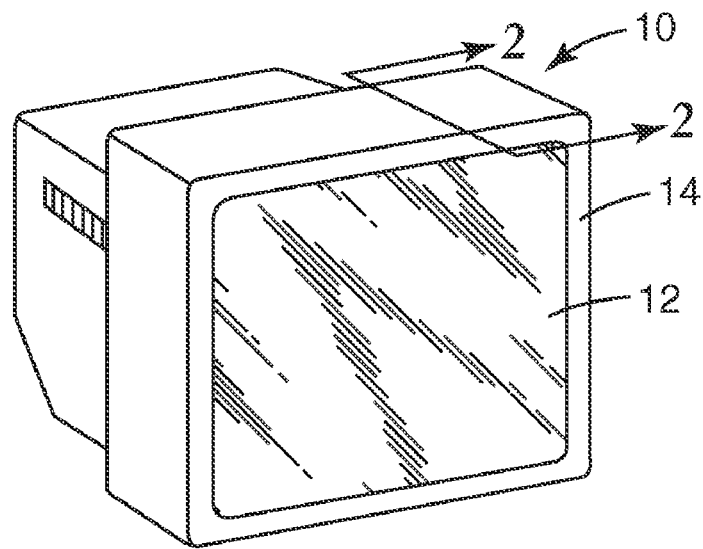
FIG. 1 is perspective view of an embodied optical display article.

Referring now to FIG. 1, a perspective view of an article (here a computer monitor 10) having an optical display 12 coupled within a housing 14. The optical display 12 comprises a substantially transparent, light transmissive material through which a user can view text, graphics or other displayed information.

Both gloss and matte light transmissive substrates 12 are employed in display panels, windows, and other articles. The (e.g. display) substrate 12 may comprise or consist of any of a wide variety of non-polymeric materials, such as glass, or various thermoplastic and crosslinked polymeric materials, such as polyethylene terephthalate (PET), (e.g. bisphenol A) polycarbonate, cellulose acetate, poly(methyl methacrylate), and polyolefins such as biaxially oriented polypropylene which are commonly used in various optical devices.

Figure 2:
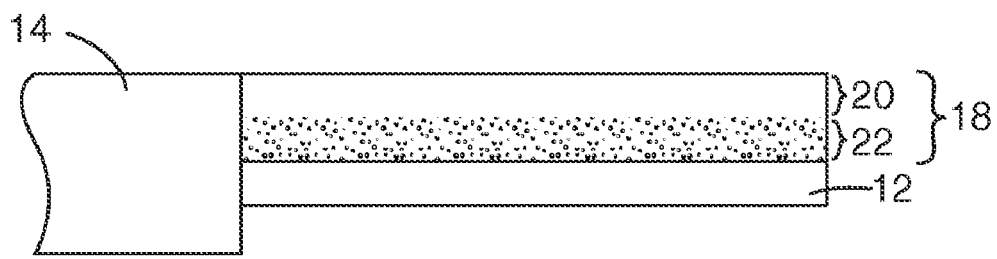
FIG. 2 is a sectional view of the article of FIG. 1 taken along line 2-2 illustrating an embodied AR film having a low refractive index layer, a gradient layer, and a high refractive index layer.

With reference to FIG. 2, optical display 12 includes AR film 18 having at least one layer of a high refractive index layer 22 below a low refractive index layer 20. Low refractive index layer 20 is typically a surface layer exposed to the environment, as depicted in FIG. 2.

The high refractive index layer has a refractive index of at least about 1.50, and typically at least about 1.55, 1.60, or greater. The maximum refractive index of the high index layer can be as much as 1.75 for high refractive index coatings comprising high refractive index inorganic particles dispersed in a crosslinked organic material. The low refractive index layer has a refractive index less than a high refractive index layer. The difference in refractive index between the high refractive index layer and low refractive index layer is typically at least 0.10, 0.15, 0.2 or greater. The low refractive index layer typically has a refractive index of less than about 1.5, less than about 1.47, less than about 1.45, or less than about 1.42. The minimum refractive index of the low index layer is generally at least about 1.35.

Figure 3:
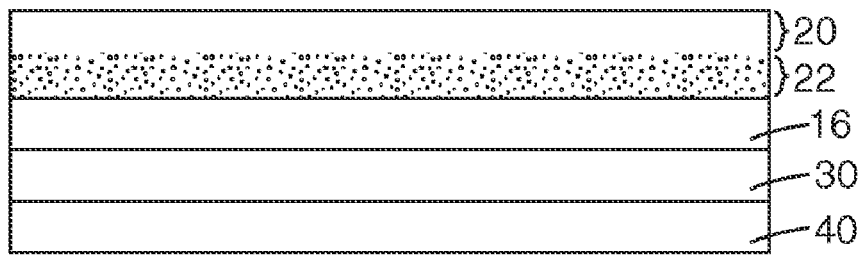
FIG. 3 is an embodied AR film article.

With reference to FIG. 3, an embodied AR film protective article may comprise a film substrate 16. The high refractive index layer 22 is disposed between the film substrate 16 and low refractive index layer 20. The AR protective film may also comprise other layers. Various permanent and removable adhesive compositions 30 may be provided on the opposite side of the film substrate 16. For embodiments that employ pressure sensitive adhesive, the AR film article typically includes a removable release liner 40. During application to a display surface, the release liner is removed so the AR film article can be adhered to the display surface. The adhesive may be microstructured to aid in the application of the protective film to the article.

For embodiments wherein the protective film is intended for use with light transmissive articles such as optical display and window for example, substrate 16 and adhesive 30 are also light transmissive since these materials are also in the optical path of the article. In such embodiments, it is preferable for the refractive index of the adhesive to be index matched (within 0.02 or 0.01) to substrate 12 or intermediate between film 16 and substrate 12. Light transmissive materials typically have a transmission of at least 80%, at least 85% and preferably at least 90%.

For embodiments wherein the protective film is intended for use with articles that are not light transmissive, such as commercial graphics on vehicles or buildings for example, the substrate and adhesive can be opaque.

Suitable adhesive compositions include (e.g. hydrogenated) block copolymers such as those commercially available from Kraton Polymers, Westhollow, Tex. under the trade designation "Kraton G-1657", as well as other (e.g. similar) thermoplastic rubbers. Other exemplary adhesives include acrylic-based, urethane-based, silicone-based and epoxy-based adhesives. Preferred adhesives are of sufficient optical quality and light stability such that the adhesive does not yellow with time or upon weather exposure so as to degrade the viewing quality of the optical display. The adhesive can be applied using a variety of known coating techniques such as transfer coating, knife coating, spin coating, die coating and the like. Exemplary adhesives are described in U.S. Patent Application Publication No. 2003/0012936. Several of such adhesives are commercially available from 3M Company, St. Paul, Minn. under the trade designations 8141, 8142, and 8161.

The AR film substrate 16 is selected based in part on the desired optical and mechanical properties such as flexibility, dimensional stability and impact resistance. Substrate 16 may comprise or consist of any of the thermoplastic and crosslinked polymeric materials as optical display 12. Substrate 16 may also comprise or consist of polyamides, polyimides, phenolic resins, polystyrene, styrene-acrylonitrile copolymers, epoxies, and the like.

Various light transmissive optical films suitable for use as film substrate 16 are known including but not limited to, multilayer optical films, microstructured films such as retroreflective sheeting and brightness enhancing films, (e.g. reflective or absorbing) polarizing films, diffusive films, as well as (e.g. biaxial) retarder films and compensator films such as described in U.S. Patent Application Publication No. 2004/0184150, Jan. 29, 2004.

Film substrate 16 may comprise a hybrid material, having both organic and inorganic components.

The film substrate 16 thickness typically also will depend on the intended use. For most applications, a substrate thickness of less than about 0.5 mm is preferred, with about 0.02 to about 0.2 mm being more preferred. Self-supporting polymeric films are preferred. The polymeric material can be formed into a film using conventional filmmaking techniques such as by extrusion and optional uniaxial or biaxial orientation of the extruded film. The substrate can be treated to improve adhesion between the substrate and the adjacent layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion.

An optional hardcoat layer can be provided between substrate 12 or 16 and the high refractive index layer 22. When present, the thickness of the hardcoat layer is typically at least 0.5 microns, preferably at least 1 micron, and more preferably at least 2 microns. The thickness of the hardcoat layer is generally no greater than 25 microns. Preferably the thickness ranges from 3 microns to 5 microns.

The optional hardcoat layer typically contains (e.g. surface modified) nanometer-sized inorganic oxide particles dispersed in a binder matrix. Typically the hardcoat is formed by coating a curable liquid creamer composition onto the substrate and curing the composition in situ to form a hardened film. Suitable coating methods include those subsequently described for application of the (e.g. fluorochemical) self-assembling antireflective coating. Further details concerning hardcoats can be found in U.S. Pat. Nos. 6,132,861 (Kang et al. '861), 6,238,798 B1 (Kang et al. '798), 6,245,833 B1 (Kang et al. '833) and 6,299,799 (Craig et al. '799).

AR films preferably have an average reflectance of less than 3% or 2% at 450 nm to 650 nm as measured with a Lambda 900 spectrophotometer (Perkin Elmer Life And Analytical Sciences, Inc. Waltham, Mass.) in reflection mode from 450 to 650 nm.

Another way to express the antireflection properties of an AR film is with respect to the minimum reflection and minimum wavelength. The minimum reflection is less than 3% and preferably less than 2% at a wavelength between 450 nm to 650 nm. In order to provide good antireflection properties throughout this visible spectrum wavelength range, it is preferred that the minimum reflection occurs at a wavelength near the center of this range, i.e. near 550 nm+/−20 nm.

In the case of gloss AR films, the haze of the AR film is preferably less than 5%, 4%, 3%, or 2%, and more preferably less than 1.0%, 0.8%, or 0.6%. However, AR films with higher haze are suitable for application to matte and opaque substrates.

The self-assembling AR coating composition is initially a substantially homogeneous stable dispersion. The coating composition comprises surface modified nanoparticles and a polymerizable organic composition dispersed in a (e.g. organic) solvent. The polymerizable organic composition comprises one more ethylenically unsaturated monomer(s), oligomer(s), polymer(s), or mixture thereof that preferably crosslink upon exposure to ultraviolet radiation. The organic composition (i.e. in the absence of the surface modified high refractive index nanoparticles) has a low refractive index. Preferably, the low refractive index of the organic material is achieved by the incorporation of one or more fluorinated ethylenically unsaturated monomers, oligomers, polymers, or mixtures thereof.

The self-assembling AR coating composition comprises surface modified nanoparticles having a high refractive index, i.e. of at least 1.6. The AR coating composition may optionally comprise other inorganic particles such as low refractive index nanoparticles.

Various high refractive index particles are known including for example zirconia ("$ZrO_2$"), titania ("$TiO_2$"), antimony oxides, alumina, tin oxides; alone or in combination as a mixtures or mixed metal oxide. Zirconias for use in the high refractive index layer are available from Nalco Chemical Co. under the trade designation "Nalco OOSSOO8" and from Buhler AG Uzwil, Switzerland under the trade designation "Buhler zirconia Z—WO sol". Zirconia nanoparticle can also be prepared such as described in U.S. Patent Application Publication No. 2006/0148950 filed Dec. 30, 2004 and U.S. Pat. No. 6,376,590.

The concentration of high refractive index nanoparticles in the self-assembling AR coating composition is typically at least about 10 wt-% solids, 15 wt-% solids, or 20 wt-% solids. The concentration of inorganic particle is typically no greater than about 60 wt-% solids, and more preferably about 40 wt-% solids to about 50 wt-% solids.

The high refractive index nanoparticles are surface modified with a surface treatment that raises the surface tension of the nanoparticles sufficiently above the low refractive index polymerizable organic material such that the nanoparticles separate from the assembled low refractive index surface layer. Without intending to be bound by theory, the difference in surface tension between the surface modified nanoparticles and the polymerizable organic composition is surmised to cause the self-assembling AR coating composition to separate into a low refractive index layer and a high refractive index layer.

Figure 4:
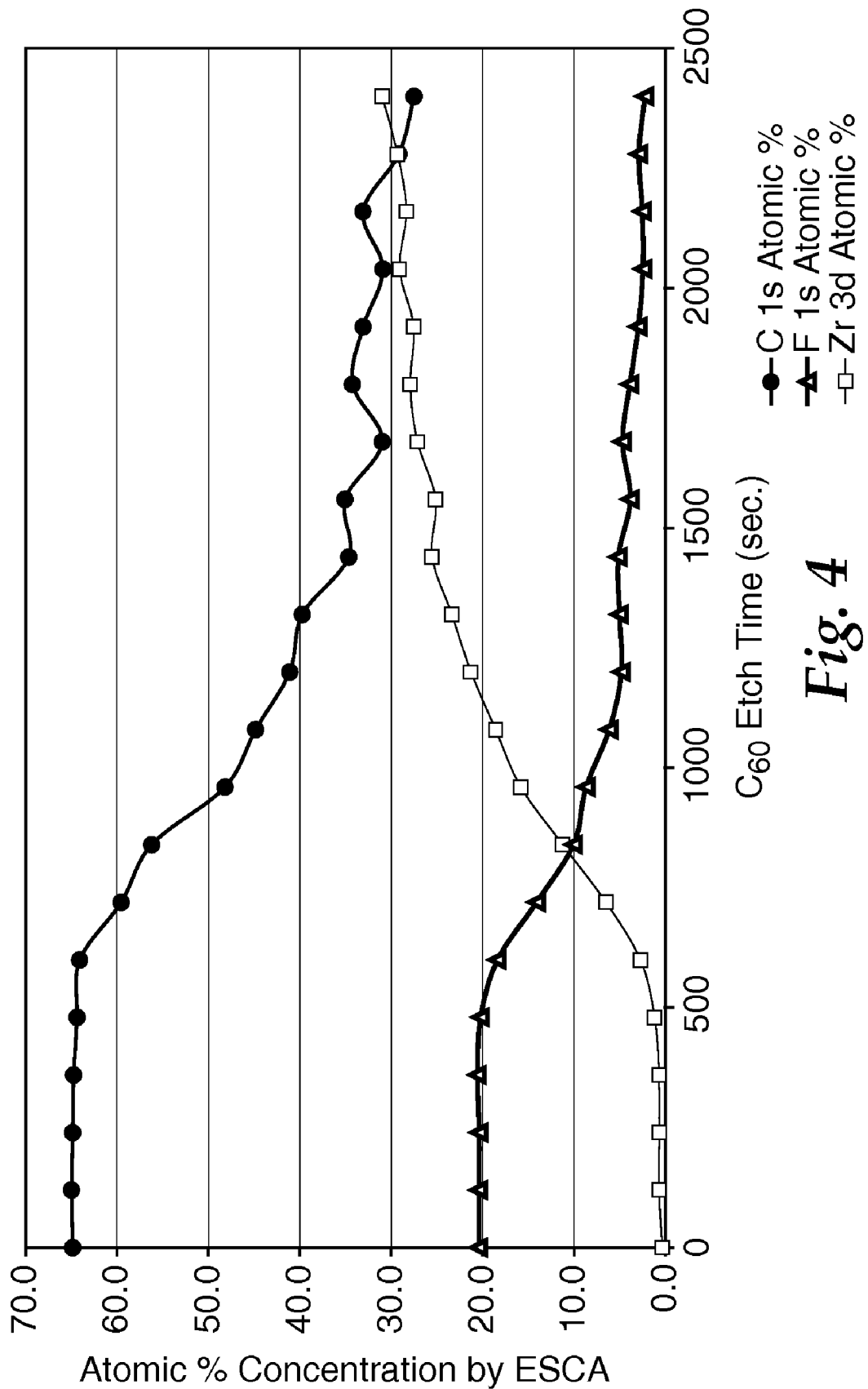
FIG. 4 is a graph showing the presence of atomic wt-% carbon, fluorine, and zirconium in the depth direction of an embodied antireflective film as measured by X-ray photoelectron spectroscopy.

With reference to FIG. 4, a graph showing the presence of atomic wt-% carbon, fluorine, and zirconium in the depth direction of an embodied antireflective film as measured by X-ray photoelectron spectroscopy, the low refractive index layer (i.e. 0 to about 500 second etch time) is formed at the uppermost (e.g. surface) layer of the AR film. The low refractive index layer is typically a surface layer exposed to the environment during use of the article or protective film. A high refractive index layer (i.e. about 1500 to about 2500 second etch time) is formed below the gradient layer.

The thickness of the low refractive index layer and high refractive index layer can independently vary. The minimum thickness of each of these layers is typically at least about 20 nm. The thickness of each layer may independently range up to about 30 nm, 40 nm, 50 nm, 60 nm, 70 nm, 80 nm, 90 nm, or 100 nm.

In the illustrated embodiment, the concentration of high refractive metal (e.g. zirconium) in the low refractive index surface layer is less than 1 atomic wt-%. However, as much as 2-3 atomic % could be present in the low refractive index layer, while still providing suitable antireflection properties. The low refractive index layer comprises a crosslinked organic material, and thus a relatively high concentration of carbon. In this particular embodiment, the concentration of atomic carbon is about 65 wt-%. In other embodiments, such as when the low index layer further comprises surface modified low index nanoparticles, the concentration of atomic carbon may be lower, for example at least 25 wt-%, 30 wt-%, 35 wt-%, 40 wt-%, 45 wt-%, 50 wt-%, 55 wt-% or 60 wt-%. The low refractive index layer also comprises a relatively high concentration of fluorine or other low surface energy atom. In this particular embodiment, the amount of low surface energy atom (e.g. fluorine) in the high refractive index layer is at least 15 atomic wt-% or 20 atomic wt-%. The presence of the fluorine contributes to the low refractive index and relatively low surface tension properties of the low refractive index layer. The low refractive index layer typically has a surface tension of at least 15 dynes/cm and no greater than about 35 dynes/cm. In some embodiments, the surface tension of the low refractive index layer is less than 30 dynes/cm, 25 dynes/cm, or 20 dynes/cm.

The concentration of atomic carbon, atomic fluorine, and atomic zirconium is substantially constant throughout the (e.g. planar average) thickness of the low refractive index layer, i.e. does not vary by more than 2%, 1.5%, or 1%. Since the concentration of the components of the low refractive index layer are substantially constant, the refractive index of the low refractive index layer is also substantially constant throughout such thicknesses, i.e. varies by no more than 0.05, 0.02, or 0.01.

The concentration of atomic carbon, atomic fluorine, and atomic zirconium is also substantially constant throughout the (e.g. planar average) thickness of the high refractive index layer. However, the concentration of the components may vary to a larger extent (1 atomic wt-%, 2% atomic wt-%, 3% atomic wt-%, 4% atomic wt-%, or 5 atomic wt-%) relative to the variation of components of the low refractive index layer. The high refractive index layer comprises a substantial amount of high refractive index nanoparticles. For example, the high refractive index layer typically comprises at least 10 atomic wt-%, 15 atomic wt-%, 20 atomic wt-%, or 25 atomic wt-% of a high refractive index metal such as zirconium, titanium, or mixtures thereof. The presence of a sufficient concentration of high refractive index nanoparticles in combination with the low concentration of atomic fluorine raises the refractive index of the assembled high refractive index layer.

In contrast to AR films formed from two separate coating compositions, i.e. a low refractive index coating composition and a high refractive index coating composition, the self-assembling AR films described herein typically also comprises at least a minor amount of fluorine or other low surface energy component in the high refractive index layer. The concentration of atomic fluorine is greater than a residual amount (e.g. at least 0.5, 0.6, 0.7, 0.8, 0.9 or 1 atomic wt-%). The concentration of fluorine or other low surface energy component is typically less than 5 atomic wt-%, 4 atomic wt-%, 3 atomic wt-%, or 2 atomic wt-%.

Figure 5:
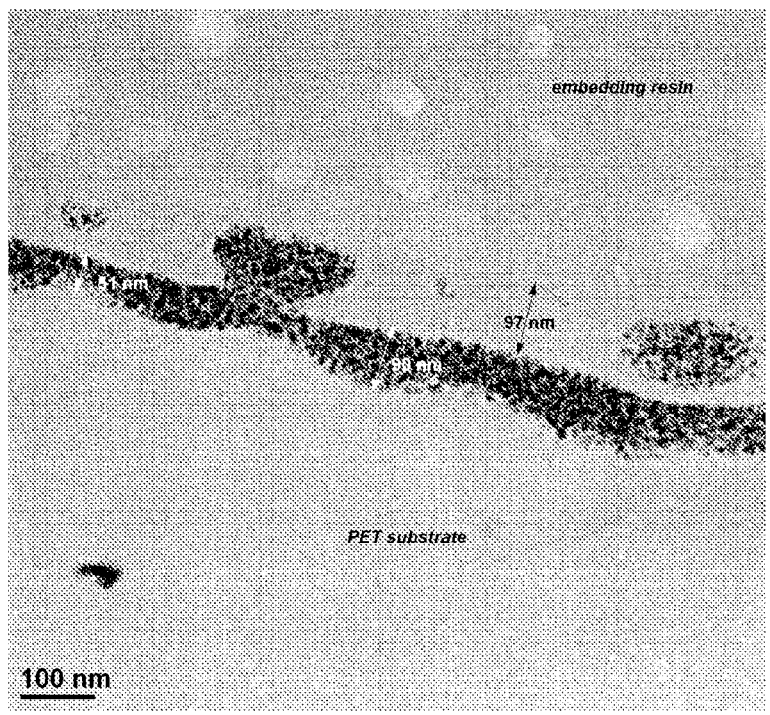
FIGS. 5 and 6 are transmission electron microscopy cross-sections of embodied AR films.
Figure 6:
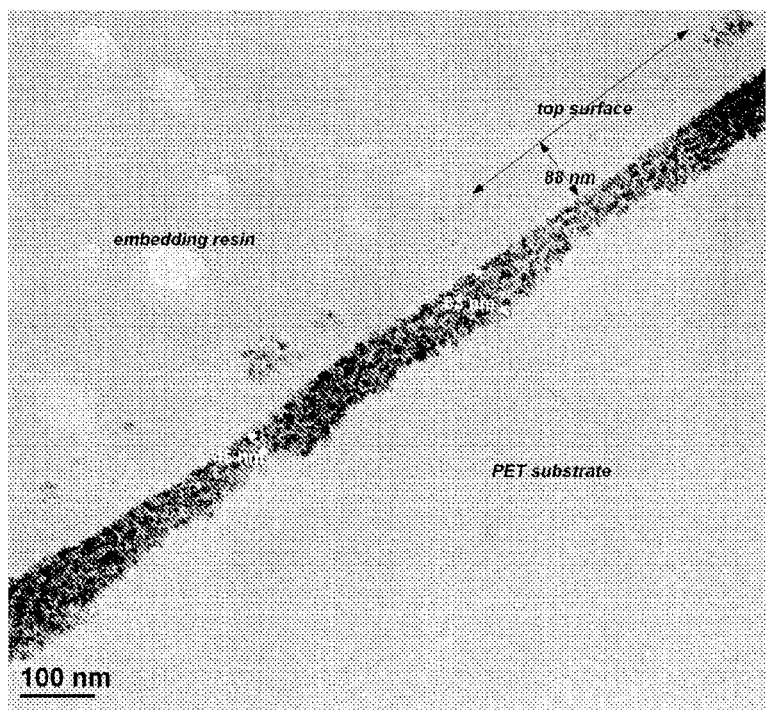

FIGS. 5-6 depict transmission electron microscopy of cross-sections of an embodied AR film. In FIG. 5, the low refractive index layer has a thickness of about 97 nm whereas the underlying high refractive index layer has thickness ranging from about 51 nm to about 90 nm. In FIG. 6, the low refractive index layer has a thickness of about 88 nm whereas the underlying high refractive index layer has thickness ranging from about 45 nm to about 83 nm.

Transmission electron microscopy analyzes a cross-section of about 1 micron in comparison to the 200 μm$^2$ area that is analyzed with X-ray photoelectron spectroscopy as depicted in FIG. 4. Although X-ray photoelectron spectroscopy has been used as a basis to conclude that a gradient layer is present between the low refractive index layer and high refractive index layer, FIGS. 5 and 6 depict that the AR films described herein are characterized by having a distinct interface between the high refractive index layer and low refractive index layer. The thickness of this interface is typically no greater than 5 nm to 10 nm. The interface between the low refractive index layer and high refractive index layer is substantially planar and parallel to the top surface layer. The interface between the high refractive index layer and the PET substrate is irregular. This irregularity is surmised to be caused by the unevenness of the primer layer on the PET substrate. In other embodiments, the interface between the substrate and the high refractive index layer is substantially planar and parallel to the top surface layer.

As illustrated in FIGS. 5-6, the AR films described herein can also or alternatively be distinguished from a 2-layer AR film by the presence of randomly distributed agglomerates of the high refractive index surface modified inorganic nanoparticles present in the low refractive index layer. As illustrated in FIG. 5, in some instances the agglomerate protrudes from the high refractive index layer. In other instances, the agglomerate is surrounded by the low refractive index organic matrix material. When the low refractive index organic composition above the agglomerate has an optical thickness of ¼ wave, the presence of the agglomerate has substantially no effect on the overall reflection properties. However, when the high refractive index agglomerate is present at the surface, the particular surface area occupied by the agglomerate is not antireflective. Accordingly, it is preferred that the total surface area of the AR film that comprises high refractive index agglomerates is less than 10% (e.g. less than 9%, 8%, 7%, 6%, 5%, 4%, 3%, 2%, or 1%) in order that the average reflectance of the AR film is within the target range.

The region of increasing zirconium at etch times ranging from about 500 seconds to 1500 seconds depicted in FIG. 4 is believed to be the average amount of high index nanoparticles in the low refractive layer as a result of the presence of the agglomerates.

Increasing the solvent concentration and/or slowing the drying rate and/or increasing the drying temperature results in the (e.g. fluorinated) low refractive index organic composition more "cleanly" separating from the high refractive index surface modified nanoparticles, thereby resulting in lower atomic fluorine concentrations in the high refractive index layer and a lower concentration of high refractive index surface agglomerates in the low refractive index layer.

The high refractive index and optionally low refractive index inorganic nanoparticles preferably have a substantially monodisperse size distribution or a polymodal distribution obtained by blending two or more substantially monodisperse distributions. Alternatively, the inorganic particles can be introduced having a range of particle sizes obtained by grinding the particles to a desired size range. The inorganic oxide particles are typically non-aggregated (substantially discrete), as aggregation can result in optical scattering (haze) or precipitation of the inorganic oxide particles or gelation. The inorganic oxide particles are typically colloidal in size, having an average particle diameter of 5 nanometers to 100 nanometers. The particle size of the high index inorganic particles is preferably less than about 50 nm in order to have sufficiently transparent. The average particle size of the inorganic oxide particles can be measured using transmission electron microscopy to determine the number of inorganic oxide particles of a given diameter.

The self-assembling AR coating composition may optionally comprise (e.g. surface modified) low refractive index (e.g. less than 1.50) nanoparticles. Such low refractive index nanoparticles preferably have a surface tension about equal to the surface tension of the low refractive index polymerizable organic composition in order that such low refractive index nanoparticles phase separate or assemble with the low refractive index (e.g. surface) layer.

Various low refractive index inorganic oxide nanoparticles are known such as nitrides, sulfide and halides (e.g. fluorides). Preferred low refractive index particle include colloidal silica, magnesium fluoride, and lithium fluoride. Silicas for use in the low refractive index composition are commercially available from Nalco Chemical Co., Naperville, Ill. under the trade designation "Nalco Collodial Silicas" such as products 1040, 1042, 1050, 1060, 2327 and 2329. Suitable fumed silicas include for example, products commercially available from DeGussa AG, (Hanau, Germany) under the trade designation, "Aerosil series OX-50", as well as product numbers -130, -150, and -200. Fumed silicas are also commercially available from Cabot Corp., Tuscola, I, under the trade designations CAB-O-SPERSE 2095", "CAB-O-SPERSE A105", and "CAB-O-SIL M5".

Surface modification agents can be represented by the formula A-B wherein A is a group capable of attaching to the nanoparticle (e.g. zirconia, titania) surface and B is a compatibilizing group. The A group can be attached to the surface of the nanoparticle by adsorption, formation of an ionic bond, formation of a covalent bond, or a combination thereof. Suitable example of A groups include for example, alcohols, amines, carboxylic acids or salts thereof, sulfonic acid or salts thereof, phosphoric acids or salts thereof, phosphonic acid and salts thereof, as well as silanes, titanates and the like. The compatibilizing group can be reactive or non-reactive and can be polar or non-polar.

The high refractive index nanoparticles are surface treated with one or more surface treatments having a surface tension (e.g. at least about 5 dynes/cm) greater than the polymerizable organic composition (i.e. the balance of the self-assembling AR coating compositions excluding solvent). Preferred surface treatments for the high refractive index nanoparticles are typically non-fluorinated and have a surface tension of at least 25, 30, 35, or 40 dynes/cm. In contrast, the low refractive index nanoparticles are preferably surface treated with one or more (e.g. fluorinated) organometallic compounds, typically having a refractive of index less than 30 dynes/cm or 25 dynes/cm. It is appreciated however, that combinations of high and low (e.g. fluorinated) surface tension surface treatments can be employed provided that the net surface tension of the nanoparticles is as previously described.

The surface tension of various polymers, oligomers, and organosilane compounds are reported in the literature, such as described in *Polymer Handbook*, 4th edition, Editors: J. Brandrup, E. H. Immergut, and E. A. Grulke published by John Wiley & Sons, Copyright 1999. The surface tension or approximate surface tension of various suitable surface treatments is reported as follows:

| Organosilane Compound | Surface Tension Dynes/cm |
|---|---|
| γ-Methacryloxypropyltrimethoxysilane (on soda-lime glass) (similar to 3-acryloxypropyltrimethoxysilane) | 44.8 |
| Glycidoxypropyltrimethoxysilane (on soda lime glass) | 49.4 |
| Poly(oxyethylene)-dimethyl ether M = 1000000 (similar to polyalkyleneoxyalkylsilane ester) | 44.2 |
| γ-Perfluoroisopropoxypropyltrimethoxysilane (on silica) | 22.8 |

When a different metal atom is substituted for the silicon atom of an organosilane compound, the surface tension is about the same as the value reported for the corresponding organosilane.

In one aspect, the organometallic compound preferably comprise an ethylenically unsaturated end-group such as an acrylate or methacrylate, or vinyl group that is copolymerizable with the polymerizable organic components of the self-assembling AR coating composition.

Suitable copolymerizable organometallic compounds may have the general formula:

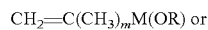

$CH_2=C(CH_3)_m M(OR)$ or

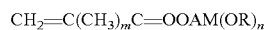

$CH_2=C(CH_3)_m C=OOAM(OR)_n$ wherein m is 0 or 1,
R is an alkyl group having 1 to 4 carbon atoms,
A is a divalent organic linking group,
M is a metal such as Si, Ti, Al, Zn, Sn and Fe, and
n is from 1 to 3.

Specific examples include 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy) propyldimethylethoxysilane, 3-(methacryloyloxy)propyldimethylethoxysilane, vinyldimethylethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltri-isopropenoxysilane, vinyltris(2-methoxyethoxy)silane, and mixtures thereof.

In order to reduce haze, a combination of a copolymerizable surface treatment and a polar-group containing surface treatment are preferably employed. For example a polyether silane or epoxy silane compound may be employed in combination with a (meth)acryl silane.

The surface modification of the nanoparticles can be accomplished in a variety known ways, such as described in previously cited U.S. Patent Application Publication No. 2006-0148950 filed Dec. 30, 2004 and U.S. Pat. No. 6,376,590.

The surface modification can be done either subsequent to mixing with the monomers or after mixing. It is typically preferred to combine the organosilane surface treatment compounds with nanoparticles before incorporation into the resin. The required amount of surface modifier is dependant upon several factors such particle size, particle type, modifier molecular wt, and modifier type. In general it is preferred that approximately a monolayer of modifier is attached to the surface of the particle. The attachment procedure or reaction conditions required also depend on the surface modifier used. For organosilanes, it is preferred to surface treat at elevated temperatures under acidic or basic conditions for from 1-24 hr approximately.

The self-assembling AR coating composition preferably comprises an ethylenically unsaturated fluorinated polymer such as a fluoro(meth)acrylate polymeric intermediate having a relatively high molecular weight. For example, the solution viscosity of the fluoro(meth)acrylate polymer in a 14.5% solids solution in ethyl acetate at room temperature (22 deg C) is typically at least 2 cps and less than 8 cps.

A preferred fluoro(meth)acrylate polymeric intermediate is further described in PCT Application No. PCT/US2007/068197, filed May 4, 2007.

The A) fluoro(meth)acrylate polymeric intermediate typically comprises the reaction product of i) at least one fluorinated multi-(meth)acrylate monomer having a fluorine content of at least about 25 wt-%; and ii) optionally one or more multi-(meth)acrylate materials having a fluorine content ranging from 0 to less than 25 wt-%. Accordingly, the fluorine content of the multi-(meth)acrylate material of ii) is less than i). The total amount of multi-(meth)acrylate materials is generally at least 25 wt-% based on wt-% solids of the polymerizable organic composition.

The fluoro(meth)acrylate polymer intermediate solution is surmised to comprise a mixture of unreacted free-radically polymerizable starting materials, oligomeric species, and polymeric species having a hyperbranched structure. A hyperbranched polymer is defined as any polymer in which the structural repeat unit has a connectivity of more than two; this definition may be extended to hypercrosslinked polymers (in which macrocycles are present, but not to ladder and spiro polymers).

A two-step process is typically employed to prepare the low refractive index organic portion of the self-assembling AR composition. A first (e.g. solution) polymerization reaction utilizes dilute organic solvent conditions to form a hyperbranched fluoroacrylate polymer (e.g. a nanogel). The hyberbranched fluoroacrylate is then utilized as a reactant in a second (e.g. photo) polymerization reaction under substantially 100% solids conditions to form the fluorinated crosslinked system that is surmised to be an interpenetrating network of the (nanogel) polymer in a crosslinked (meth)acrylate host.

The described hyperbranched polymers are surmised to have a high molecular weight while remaining soluble or dispersible. It is likely that the polymer intermediate, as initially prepared is fully solvated (e.g. with ethyl acetate) and is relatively easy to solvent-exchange and thus accepts other free-radically polymerizable monomer molecules within its polymeric matrix. When coated, concentrated or dried, and finally cured, the intermediate polymer tightens and bonds to or around the monomers, reinforcing and toughening the final films.

The hyperbranched polymer has certain similarities to materials described in some literature as microgels or nanogels. Polymer nanogel materials are formed by increasing the ratio of solvent present during the polymerization reaction, thus increasing the probability of internal cyclization as opposed to chain extension. Under conditions when macrogellation does occur, the typical polymer either precipitates from solution, or more commonly, the solution becomes gelatinous and non-fluid. In the formation of the soluble nanogels described herein, the regimes of micro- and macro-gellation are separated by a sharply defined critical volume fraction of polymer in solution. This critical volume is somewhat analogous with the gel transition of Flory-Stockmayer gelation theory. At concentrations below the critical volume fraction, soluble hyperbranched polymers with (i.e. polystyrene equivalent) molecular weights of at least $10^6$ to $10^9$ g/mol can be obtained. The critical reaction concentration depends on crosslink density and the structural parameters of the molecules.

It has been found that multifunctional (meth)acrylates can be polymerized, yet still result in soluble nanogels. Further, increasing the amount of multifunctional acrylates can provide improved coating and mechanical properties as described herein.

The A) fluoro(meth)acrylate polymeric intermediate comprises the reaction product of i) at least one fluorinated multi-(meth)acrylate monomer having a fluorine content of at least about 25 wt-%. Highly fluorinated multi-(meth)acrylate monomers are characterized by having a low refractive index. Various fluorinated multi-(meth)acrylate monomers having a fluorine content of at least about 25 wt-% are known. In some embodiments, the low refractive index multi-(meth)acrylate monomer has a fluorine content of at least 30 wt-%, at least 35 wt-%, at least 40 wt-%, at least 45 wt-%, or at least 50 wt-%.

For the preparation of the fluoro(meth)acrylate polymer intermediate ("FPA"), a single low index fluorinated multi-(meth)acrylate monomer can be homopolymerized. Alternatively, two or more low refractive index fluorinated multi-(meth)acrylate monomer(s) can be copolymerized with each other. Further yet, one or more low refractive index fluorinated multi-(meth)acrylate monomers can be copolymerized with other non-fluorinated and/or fluorinated mono- and multi-(meth)acrylate materials. The fluorinated mono-(meth)acrylate materials may also have a high fluorine content (i.e. at least 25 wt-%).

In some embodiments, the total amount of multi-(meth)acrylate material employed during the preparation of the fluoro(meth)acrylate polymeric intermediate, e.g. the sum of fluorinated and non-fluorinated multi-(meth)acrylate monomers, is at least 30 wt-%, 40 wt-%, 50 wt-%, 60 wt-%, 70 wt-%, 80 wt-%, 90 wt-% and even 100% based on the total solids of the organic portion on the reaction mixture. The total amount of low refractive index fluorinated multi-(meth)acrylate (i.e. having a fluorine content of at least about 25 wt-%) may be at least 30 wt-%, 40 wt-%, 50 wt-%, 60 wt-%, 70 wt-%, 80 wt-%, 90 wt-% and even 100% based on the total solids of the organic portion of the reaction mixture (i.e. excluding any inorganic nanoparticle).

The self-assembling AR coating composition preferably comprises the reaction product of A) at least one fluoro(meth) acrylate polymeric intermediate ("FPA"), B) at least one (e.g. non-fluorinated) (meth)acrylate crosslinking material having three of more (meth)acrylate groups), and C) the surface modified high refractive index nanoparticles. The mixture is preferably cured by exposure to (e.g. ultraviolet light) radiation. The cured polymeric composition may comprise copolymerization reaction products of A) and B); A) and C); and/or A), B) and C). The fluoro(meth)acrylate polymer intermediate may covalently bond to other components within the low refractive index coating composition. The non-fluorinated crosslinker, may polymerize physically entangling the fluoro (meth)acrylate polymer intermediate thereby forming an interpenetrating network.

The self-assembling AR composition comprises at least 5 wt-% or 10 wt-% and less than 50 wt-% or 40 wt-% of non-fluorinated crosslinker(s). In some embodiments, the amount of non-fluorinated crosslinker(s) ranges from about 15 wt-% to about 30 wt-%.

Suitable monomers include for example trimethylolpropane triacrylate (commercially available from Sartomer Company, Exton, Pa. under the trade designation "SR351") ethoxylated trimethylolpropane triacrylate (commercially available from Sartomer Company, Exton, Pa. under the trade designation "SR454"), pentaerythritol tetraacrylate, pentaerythritol triacrylate (commercially available from Sartomer under the trade designation "SR444"), dipentaerythritol pentaacrylate (commercially available from Sartomer under the trade designation "SR399"), ethoxylated pentaerythritol tetraacrylate, ethoxylated pentaerythritol triacrylate (from Sartomer under the trade designation "SR494") dipentaerythritol hexaacrylate, and tris(2-hydroxy ethyl) isocyanurate triacrylate (from Sartomer under the trade designation "SR368"). Aliphatic and aromatic urethane hexaacrylates such as commercially available from UCB Chemicals under the trade designations "Ebecry 8301" and "Ebecry 220" also can be employed. In some aspects, a hydantoin moiety-containing multi-(meth)acrylates compound, such as described in U.S. Pat. No. 4,262,072 (Wendling et al.) is employed.

Various fluorinated mono- and multi-functional free-radically polymerizable monomers, oligomers, and polymers may be employed in the preparation of the fluoro(meth)acrylate polymer (e.g. intermediate) described herein. Such materials generally comprises free-radically polymerizable moieties in combination with (per)fluoropolyether moieties, (per) fluoroalkyl moieties, and (per)fluoroalkylene moieties. Within each of these classes are multi-functional species having a high fluorine content, (e.g. of at least 25 wt-%) that can be employed as i). Other species within each class, having fluorine content less than 25 wt-%, can be employed as ii) and/or as an auxiliary component. In some embodiments, an auxiliary fluorinated (meth)acrylate monomer can aid in compatibilizing the low refractive index or other fluorinated materials present in the reaction mixture.

The low refractive index layer and fluoro(meth)acrylate polymer may be prepared from a variety of (per)fluoropolyether (meth)acrylate compounds such as described in PCT Application No. PCT/US2007/068197, filed May 4, 2007.

One preferred high fluorine containing material is a (e.g. perfluoropolyether) acrylate oligomer reported by the supplier to have a refractive index of 1.341 commercially available from Sartomer under the trade designation "CN4000". In view of the low refractive index, this material is believed to have a fluorine content of at least about 50 wt-%. Based on NMR analysis, CN4000 has a molecular weight (Mn) of about 1300 g/mole.

Other commercially available low refractive index perfluoropolyether compounds include a perfluoropolyether caprolactone diacrylate compound, available from Cytonix Corporation, Beltsville, Md., under the trade designation "Fluor N 1939A" and perfluoropolyether glycol diacrylate, also available from Cytonix Corporation under the trade designation "Fluor N 1970A"

Other high fluorine perfluoropolyether (meth)acrylates can be prepared by reaction of a commercially available perfluoropolyether compounds (such as available from Solvay Solexis under the trade designation "Fomblin Zdol 2000") with acryloyl chloride using methods described in Example 15 of U.S. Pat. No. 3,810,874.

In some embodiments, the perfluoropolyether group comprises an "HFPO—" end group, i.e. the end group $F(CF(CF_3)CF_2O)_aCF(CF_3)$— (of the methyl ester $F(CF(CF_3)CF_2O)_aCF(CF_3)C(O)OCH_3$) wherein "a" averages 2 to 15. In some embodiments, a averages between 3 and 10 or a averages between 5 and 8. Such compound generally exist as a distribution or mixture of oligomers with a range of values for a, so that the average value of a may be non-integer. In one embodiment, a averages about 6.2.

In some embodiments, the perfluoropolyether (meth)acrylate compound(s) may be characterized as perfluoropolyether urethane compounds. Such materials generally include at least one polymerizable (e.g. terminal) (meth)acrylate moiety and at least one (optionally repeating) unit including a (per) fluoropolyether group bonded by means of a linking group having a valency of at least two to a urethane or urea linkage. The urethane and urea linkage is typically —NHC(O)X— wherein X is O, S or NR; and R is H or an alkyl group having 1 to 4 carbon. The perfluoropolyether moiety can be a HFPO— moiety, as previously described. Various suitable compounds are described in U.S. Patent Application Publication No. 2006/0216524 and Pending U.S. application Ser. No. 11/277,162, filed Mar. 22, 2006. One exemplary high fluorine perfluoropolyether urethane (meth)acrylate is HFPO—C(O)NHC$_2$H$_4$OC(O)NHC$_2$H$_4$OC(O)C(CH$_3$)=CH$_2$.

Various perfluoroalkyl multi-(meth)acrylate for use in the preparation of the FPA or self-assembling AR composition are known. Various commercially available low refractive index species are described in Table 1 as follows:

TABLE 1

| Chemical Description | Supplier (Location) | Wt-% Fluorine |
|---|---|---|
| 2,2,3,3,4,4,5,5-octafluorohexane-1,6-diacrylate | Exfluor Research Corp., Round Rock, TX | 41.06 |
| 2,2,3,3,4,4,5,5-octafluoro hexane-1,6-dimethacrylate | Exfluor Research Corp. | 38.16 |
| 2,2,3,3-tetrafluorobutane-1,4-diacrylate | Oakwood Products Inc., West Columbia, SC | 28.13 |

TABLE 1-continued

| Chemical Description | Supplier (Location) | Wt-% Fluorine |
|---|---|---|
| 2,2,3,3-tetrafluorobutane-1,4-dimethacrylate | Oakwood Products Inc. | 25.49 |
| fluorinated tetraethylene glycol diacrylate | Oakwood Products Inc. | |
| 2,2,3,3,4,4-hexafluoropentane-1,5-diacrylate | SynQuest Laboratories, Inc. Alachua, FL | 35.6 |

Other low refractive index perfluoroalkyl multi-(meth)acrylate compounds can be synthesized. For example, $C_4F_9SO_2N(C_2H_4OC(O)CH=CH_2)_2$ (Mn of 567.9 MW and fluorine content of 30.11%) and $C_4F_9SO_2N(C_2H_4OC(O)C(CH_3)=CH_2)_2$ (Mn of 595.99 and fluorine content of 28.69%) can be synthesized by first preparing the fluorochemical diol FBSEE ($C_4F_9SO_2N(C_2H_4OH)_2$) as described in column 5, line 31 and in FIG. 9 of U.S. Pat. No. 3,734,962 (1973) and then preparing the acrylate derivative by the method described in Example 2B of WO 01/30873 to Savu et al.

The preparation of the fluoroacrylate (meth)acrylate polymeric intermediate or the self-assembling AR composition can optionally include various fluorinated monoacrylate materials including for example 2,2,2-trifluoroethyl (meth)acrylate; 2,2,3,3,3-pentafluoropropyl (meth)acrylate; 2,2,3,3,4,4,4-heptafluorobutyl (meth)acrylate; 2,2,3,3,4,4,5,5,5-nonafluoropentyl (meth)acrylate; 2,2,3,3,4,4,5,5,6,6,6-undecafluorohexyl (meth)acrylate; 2,2,3,3,4,4,5,5,6,6,7,7,7-tridecafluoroheptyl (meth)acrylate; 2,2,3,3,4,4,5,5,6,6,7,7,8,8,8-pentadecafluoro octyl (meth)acrylate; 3,3,4,4,5,5,6,6,7,7,8,8,8-tridecafluoro octyl (meth)acrylate; 2,2,3,3,4,4,5,5,6,6,7,7,8,8,9,9,10,10,10-nonadecafluorodecyl (meth)acrylate; 3,3,4,4,5,5,6,6,7,7,8,8,9,9,10,10-heptadecafluorodecyl (meth)acrylate; 2-trifluoromethyl-3,3,3-trifluoropropyl (meth)acrylate; 3-trifluoromethyl-4,4,4-trifluorobutyl (meth)acrylate; 1-methyl-2,2,3,3,3-pentafluoropropyl (meth)acrylate; 1-methyl-2,2,3,3,4,4,4-heptafluorobutyl (meth)acrylate; 2,2,3,3,4,4-hexafluorocyclobutyl (meth)acrylate; 2,2,3,3,4,4,5,5-octafluorocyclopentyl (meth)acrylate; 2,2,3,3,4,4,5,5,6,6-decafluorocyclohexyl (meth)acrylate; 2,2,3,3,4,4,5,5,6,6,7,7-dodecafluorocycloheptyl (meth)acrylate; 2,2,3,3,4,4,5,5,6,6,7,7,8,8-tetradecafluorocyclooctyl (meth)acrylate; 2-trifluoromethylcyclobutyl (meth)acrylate; 3-trifluoromethyl cyclobutyl (meth)acrylate; 2-trifluoromethyl cyclopentyl (meth)acrylate; 3-trifluoromethyl cyclopentyl (meth)acrylate; 2-trifluoromethyl cyclohexyl (meth)acrylate; 3-trifluoromethyl cyclohexyl (meth)acrylate; 4-trifluoromethyl cyclohexyl (meth)acrylate; 2-trifluoromethyl cycloheptyl (meth)acrylate; 3-trifluoromethyl cycloheptyl (meth)acrylate; and 4-trifluoromethylcycloheptyl (meth)acrylate.

The preparation of the fluoroacrylate (meth)acrylate polymeric intermediate or the self-assembling AR composition can optionally include various perfluoropolyether mono-(meth)acrylate compounds. One such exemplary low refractive index material is HFPO—C(O)NHCH$_2$CH$_2$OC(O)CH=CH$_2$, calculated to have 62.5 wt-% F. Other low refractive index perfluoropolyether mono-(meth)acrylate compounds that can be prepared in a similar manner are HFPO—C(O)NHCH$_2$CH$_2$OCH$_2$CH$_2$OCH$_2$CH$_2$OC(O)CH=CH$_2$ calculated to have 59.1 wt-% F, HFPO—C(O)NH(CH$_2$)$_6$OC(O)CH=CH$_2$ calculated to have 60.2 wt-% F, and HFPOC(O)NHCH$_2$CH$_2$OCH$_2$CH$_2$OCH$_2$CH$_2$OCH$_2$CH$_2$OC(O)CH=CH$_2$ calculated to have 57.3 wt-% F. Such compounds are described in U.S. patent application Ser. No. 11/277,162 filed Mar. 22, 2006 (e.g. Preparations 31a-31d).

The preparation of the fluoroacrylate (meth)acrylate polymeric intermediate or the self-assembling AR composition can optionally include various non-fluorinated difunctional (meth)acrylate monomers. Various difunctional (meth)acrylate monomers are known in the art, including for example 1,3-butylene glycol diacrylate, 1,4-butanediol diacrylate, 1,6-hexanediol diacrylate, 1,6-hexanediol monoacrylate monomethacrylate, ethylene glycol diacrylate, alkoxylated aliphatic diacrylate, alkoxylated cyclohexane dimethanol diacrylate, alkoxylated hexanediol diacrylate, alkoxylated neopentyl glycol diacrylate, caprolactone modified neopentylglycol hydroxypivalate diacrylate, caprolactone modified neopentylglycol hydroxypivalate diacrylate, cyclohexanedimethanol diacrylate, diethylene glycol diacrylate, dipropylene glycol diacrylate, ethoxylated bisphenol A diacrylate, neopentyl glycol diacrylate, polyethylene glycol diacrylate, (Mn=200 g/mole, 400 g/mole, 600 g/mole), propoxylated neopentyl glycol diacrylate, tetraethylene glycol diacrylate, tricyclodecanedimethanol diacrylate, triethylene glycol diacrylate, and tripropylene glycol diacrylate.

Small concentrations of oligomeric di(meth)acrylate compounds such as for example, urethane acrylates, polyester acrylates, epoxy acrylates, and combinations thereof may optionally be employed in the preparation of the fluoroacrylate (meth)acrylate polymeric intermediate or the self-assembling AR composition.

At least one free-radical initiator is typically utilized for the preparation of the fluoro(meth)acrylate polymeric intermediate and the self-assembling AR coating composition. Useful free-radical thermal initiators include, for example, azo, peroxide, persulfate, and redox initiators, and combinations thereof. Useful free-radical photoinitiators include, for example, those known as useful in the UV cure of acrylate polymers. In some aspects, the fluoro(meth)acrylate polymer (e.g. intermediate) is solution polymerized by use of a thermal initiator; whereas the self-assembling AR composition is preferably photopolymerized.

Other additives may be added. These include but are not limited to resinous flow aids, photostabilizers, high boiling point solvents, and other compatibilizers well known to those of skill in the art.

The fluoro(meth)acrylate polymer (e.g. intermediate) can be formed, dissolved, or dispersed, in a compatible (e.g. non-fluorinated) organic solvent. The fluoro (meth)acrylate polymer intermediate is typically present at concentration of at least 5 wt-% solids. In some embodiments, the fluoro(meth)acrylate polymer intermediate is present at a concentration of at least about 10 wt-%. At concentrations exceeding 15 wt-%, the composition may gel. It is typically preferred that the concentration of fluoro (meth)acrylate polymer approaches, yet is less than, the concentration that causes a gel transition in order to maximize molecular weight of the fluoro(meth)acrylate polymer.

The self-assembling AR coating composition can be prepared by combining the fluoro(meth)acrylate polymer solution with the (meth)acrylate crosslinker, surface modified nanoparticles, and a photoinitiator, optionally diluting the mixture to about 1 to 10 percent solids with additional solvent.

A single organic solvent or a blend of solvents can be employed in the preparation of the fluoro(meth)acrylate polymer (e.g. intermediate) and self-assembling AR composition. Depending on the free-radically polymerizable materials employed, suitable solvents include alcohols such as isopropyl alcohol (IPA) or ethanol; ketones such as methyl ethyl ketone (MEK), methyl isobutyl ketone (MIBK), diisobutyl ketone (DIBK); cyclohexanone, or acetone; aromatic hydrocarbons such as toluene; isophorone; butyrolactone; N-methylpyrrolidone; tetrahydrofuran; esters such as lactates, acetates, including propylene glycol monomethyl ether acetate such as commercially available from 3M under the trade designation "3M Scotchcal Thinner CGS10" ("CGS10"), 2-butoxyethyl acetate such as commercially available from 3M under the trade designation "3M Scotchcal Thinner CGS50" ("CGS50"), diethylene glycol ethyl ether acetate (DE acetate), ethylene glycol butyl ether acetate (EB acetate), dipropylene glycol monomethyl ether acetate (DPMA), iso-alkyl esters such as isohexyl acetate, isoheptyl acetate, isooctyl acetate, isononyl acetate, isodecyl acetate, isododecyl acetate, isotridecyl acetate or other iso-alkyl esters; combinations of these and the like.

The fluoro(meth)acrylate polymer intermediate as well as self-assembling AR coating composition form a compatible coating, preferably in the absence of fluorinated solvents. Although various fluorinated solvents could be employed, in one aspect the compositions are free of fluorinated solvents. Compatible coating compositions are clear, rather than hazy. Compatible coatings are substantially free of visual defects. Visual defects that may be observed when incompatible coating are employed include but are not limited to haze, pock marks, fisheyes, mottle, lumps or substantial waviness, or other visual indicators known to one of ordinary skill in the art in the optics and coating fields.

The method of forming an AR coated article or AR protective film includes providing a (e.g. light transmissible) substrate layer and providing the composition on the (optionally primed) substrate layer. The method typically comprises irradiating the coated substrate with a sufficient ultraviolet radiation to crosslink. Alternatively, a transferable antireflection film may be formed coating the composition to a release liner, at least partially cured, and subsequently transferring from the release layer to the substrate using a thermal transfer or photoradiation application technique.

The composition can be applied as a single or multiple layers directly to an article such as an optical display or window or directly to a film substrate using conventional film application techniques. Although it is usually convenient for the film substrate to be in the form of a roll of continuous web, the coatings may be applied to individual sheets.

Thin films can be applied using a variety of techniques, including dip coating, forward and reverse roll coating, wire wound rod coating, and die coating. Die coaters include knife coaters, slot coaters, slide coaters, fluid bearing coaters, slide curtain coaters, drop die curtain coaters, and extrusion coaters among others. Many types of die coaters are described in the literature such as by Edward Cohen and Edgar Gutoff, Modern Coating and Drying Technology, VCH Publishers, NY 1992, ISBN 3-527-28246-7 and Gutoff and Cohen, Coating and Drying Defects: Troubleshooting Operating Problems, Wiley Interscience, NY ISBN 0-471-59810-0.

The coating composition is dried to remove the solvent and then cured for example by exposure to ultraviolet radiation (e.g. using an H-bulb or other lamp) at a desired wavelength, preferably in an inert atmosphere (less than 50 parts per million oxygen) or an electron beam. The photocuring causes the assembled AR coating composition to crosslink. Such crosslinking is surmised to result in a fluoro(meth)acrylate polymer phase and a (meth)acrylate phase substantially entangled, thereby forming an interpenetrating polymer network, or IPN.

The fluorinated component(s) of the AR coating composition provide low surface energy. The surface energy of the low index layer can be characterized by various methods such as contact angle and ink repellency. The static contact angle with water of the cured low refractive index layer is typically at least 80°. More preferably, the contact angle is at least 90° and most preferably at least 100°. Alternatively, or in addition thereto, the advancing contact angle with hexadecane is at least 50° and more preferably at least 60°. Low surface energy is amenable to anti-soiling and stain repellent properties as well as rendering the exposed surface easy to clean.

The self-assembling AR coating can be applied to a gloss or matte surface. For example, the surface can be roughened or textured to provide a matte surface. This can be accomplished in a variety of ways as known in the art including embossing the low refractive index surface with a suitable tool that has been bead-blasted or otherwise roughened, as well as by curing the composition against a suitable roughened master as described in U.S. Pat. Nos. 5,175,030 (Lu et al.) and 5,183,597 (Lu).

Matte coatings can also be prepared by adding a suitably sized particle filler such as silica sand or glass beads to the composition. Such matte particles are typically substantially larger than the surface modified low refractive index particles. For example the average particle size typically ranges from about 1 to 10 microns. The concentration of such matte particles may range from at least 2 wt-% to about 10 wt-% or greater. At concentrations of less than 2 wt-% (e.g. 1.8 wt-%, 1.6 wt-%, 1.4 wt-%, 1.2 wt-%, 1.0 wt-%, 0.8 wt-%, 0.6 wt-%, the concentration is typically insufficient to produce the desired reduction in gloss (i.e. haze).

In yet another aspect, matte AR films can be prepared by providing the self-assembling AR coating composition on a matte film substrate. Exemplary matte films are commercially available from U.S.A. Kimoto Tech, Cedartown, Ga. under the trade designation "N4D2A".

Matte AR films typically have lower transmission and higher haze values than typical gloss films. For example the haze is generally at least 5%, 6%, 7%, 8%, 9%, or 10% as measured according to ASTM D1003. Whereas gloss surfaces typically have a haze of less than 5%, 4% or 3%.

The self-assembling AR coatings and films described herein are suitable for application to optical displays ("displays"). The displays include various illuminated and non-illuminated displays panels. Such displays include multi-character and especially multi-line multi-character displays such as liquid crystal displays ("LCDs"), plasma displays, front and rear projection displays, cathode ray tubes ("CRTs"), signage, as well as single-character or binary displays such as light emitting tubes ("LEDs"), signal lamps and switches.

The self-assembling AR coatings and films can be employed with a variety of portable and non-portable information display articles. These articles include, but are not limited to, PDAs, LCD-TV's (both edge-lit and direct-lit), cell phones (including combination PDA/cell phones), touch sensitive screens, wrist watches, car navigation systems, global positioning systems, depth finders, calculators, electronic books, CD and DVD players, projection televisions screens, computer monitors, notebook computer displays, instrument gauges, and instrument panel covers. These devices can have planar or curved viewing faces.

The self-assembling AR coatings and films can be employed on a variety of other articles as well such as for example camera lenses, eyeglass lenses, binocular lenses, mirrors, retroreflective sheeting, automobile windows, building windows, train windows, boat windows, aircraft windows, vehicle headlamps and taillights, display cases, eyeglasses, overhead projectors, stereo cabinet doors, stereo covers, watch covers, as well as optical and magneto-optical recording disks, and the like.

The self-assembling AR coating may also be applied to a variety of other articles including (e.g. retroreflective) signage and commercial graphic display films employed for various advertising, promotional, and corporate identity uses.

The recitation of numerical ranges by endpoints includes all numbers subsumed within the range (e.g. the range 1 to 10 includes 1, 1.5, 3.33, and 10).

The phrase "free-radically polymerizable" refers to monomers, oligomers, and polymers having functional groups that participate in crosslinking reactions upon exposure to a suitable source of free radicals. Free-radically polymerizable group include for example (meth)acryl groups, —SH, allyl, or vinyl. The free-radically polymerizable group may be halogenated with for example fluorine such as in the case of —COCF=CH$_2$.

A preferred free-radically polymerizable group is "(meth) acryl" with includes (meth)acrylamides, and (meth)acrylates optionally substituted with for example fluorine and sulfur. A preferred (meth)acryl group is acrylate. Multi-(meth)acrylate materials comprise at least two polymerizable (meth)acrylate groups; whereas as mono-(meth)acrylate material has a single (meth)acrylate group. The (meth)acrylate groups may be pendant groups, yet are typically present as terminal groups.

As used herein, "wt-%" refers to the sum of the solid components with the exception of solvent. Unless specified otherwise, the concentration of materials is typically expressed with reference to wt-% solids of the organic composition (i.e. prior to the addition of inorganic nanoparticles).

While the invention has been described in terms of preferred embodiments, it will be understood, of course, that the invention is not limited thereto since modifications may be made by those skilled in the art, particularly in light of the foregoing teachings.

Multi-Functional Free-Radically Polymerizable Fluorinated Components

C6DIACRY is the trade designation for 2,2,3,3,4,4,5,5-octafluoro-1,6-hexanediol diacrylate (commonly referred to as 8F-HDDA), having a molecular weight of 370.2 g/mole and at least 40 wt-% fluorine was obtained from Exfluor Research Corporation, of Round Rock, Tex.

CN 4000 is the trade designation for a perfluoropolyether acrylate oligomer reported by the supplier to have a refractive index of 1.341 obtained from Sartomer Company, Exton, Pa.

OFPMA is 1H,1H,5H-Octafluoropentyl methacrylate (Oakwood Products, West Columbus, S.C.)

Surface Treatments 3-methacryloxypropyltrimethoxysilane is available from Alfa Aesar, Ward Hill, Mass. (Stock #30505) and was used as received.

3-acryloxypropyltrimethoxysilane available from Gelest, Inc. Morrisville, Pa. (Product #SIA0200.0) and was used as received.

Silquest A-1230 is the trade designation for a proprietary polyalkyleneoxyalkylsilane ester supplied by GE Silicones (Friendly, VW).

3-glycidoxy propyl trimethoxysilane available from Aldrich Chemical Company, Milwaukee, Wis.)

Non-Fluorinated Crosslinkers

SR399 is the trade designation for dipentaerythritol pentaacrylate (molecular weight of 525 g/mole), a non-fluorinated multifunctional (meth)acrylate monomer obtained from Sartomer Company, of Exton, Pa.

SR355 is the trade designation for di-trimethoxy propane triacrylate obtained from Sartomer Company.

SR368 is the trade designation for tris (2-hydroxy ethyl) isocyanurate triacrylate obtained from Sartomer Company.

SR247 is the trade designation for neopentyl glycol diacrylate obtained from Sartomer Company.

SR444C is the trade designation for pentaerythritol triacrylate, a multifunctional (meth)acrylate monomer obtained from Sartomer Company.

Ebecryl 220 is the trade designation for aromatic urethane hexaacrylate, a multifunctional (meth)acrylate monomer available from available from UCB Chemicals.

Ebecryl 8301 is the trade designation for aliphatic urethane hexaacrylate, a multifunctional (meth)acrylate monomer available from UCB Chemicals.

CN 997 is the trade designation for aliphatic urethane hexaacrylate, a multifunctional (meth)acrylate monomer available from Sartomer Company.

Other Ingredients

Vazo 52 is the trade designation for 2,2',-azobis(2,4-dimethylpentane nitrile), a thermal free-radical initiator obtained from DuPont, of Wilmington, Del.

Irgacure 127 is the trade designation for a UV photoinitiator, and was obtained from Ciba Specialty Products, of Tarrytown, N.Y., and used as received.

Prostab 5198 is the trade designation for 4-hydroxy-2,2,6,6-tetramethyl-1-piperidinyloxy (commonly referred to as 4-hydroxy-TEMPO), and was obtained from CIBA Specialty Chemicals, of Tarrytown, N.Y.

High Index Zirconia Nanoparticles

ZrO$_2$ sols (40.8% solids in water) was prepared were prepared in accordance with the procedures described in U.S. Patent Application Publication No. 2006/0204745 filed Mar. 14, 2005 that claims priority to U.S. patent application Ser. No. 11/078,468 filed Mar. 11, 2005.

The resulting ZrO$_2$ sols were evaluated with Photo Correlation Spectroscopy (PCS), X-Ray Diffraction and Thermal Gravimetric Analysis as described in U.S. patent application Ser. Nos. 11/079,832 and 11/078,468. The ZrO$_2$ sols used in the examples had properties in the ranges that follow:

| | PCS Data | | | |
|---|---|---|---|---|
| Dispersion Index | Intensity avg size (nm) | Volume- avg size (nm) | (Intensity-avg)/(Volume-avg) | |
| 1.0-2.4 | 23.0-37.0 | 8.0-18.8 | 1.84-2.97 | |

| Relative Intensities | | Apparent Crystallite Size (nm) | | | | | Weighted |
|---|---|---|---|---|---|---|---|
| Cubic/ Tetragonal | Monoclinic | (C, T) (1 1 1) | M (−1 1 1) | M (1 1 1) | Avg M Size | % C/T | Avg XRD Size |
| 100 | 6-12 | 7.0-8.5 | 3.0-6.0 | 4.0-11.0 | 4.5-8.3 | 89%-94% | 7.0-8.4 |

Methacrylate Silane Surface Modified Zirconia Nanoparticles—("Methacryl")

9.3 kgs of an aqueous dispersion of 10 nm zirconia nanoparticles (40.8% solids in water) was added to a 38 liter reactor. 5.9 kgs additional water and 15.1 kgs 1-methoxy-2-propanol were added to the reactor with stirring 1.1 kgs of 3-methacryloxypropyltrimethoxysilane was added slowly to the reactor with stirring. 9.5 grams of a 5% solution in water of Prostab 5198 was added to the reactor with stirring. The mixture was stirred 18 hours at 80° C.

The reaction mixture was heated under vacuum (24-40 torr) and the 1-methoxy-2-propanol/water azeotrope was distilled off to remove substantially all of the water, while slowly adding 32 kgs of additional 1-methoxy-2-propanol. 180 grams of 30% ammonium hydroxide was added to the reaction mixture. Next the reaction was concentrated to 59.2% solids by distilling off 1-methoxy-2-propanol. The surface modification reaction resulted in a mixture containing 59.2% surface modified zirconia (ZrO2-SM), by weight, in 1-methoxy-2-propanol. The final mixture was filtered through a 1 micron filter.

90/10 PEG/Acrylate Silane Surface Modified Zirconia—("90/10 PEG/Acryl")

A 1000 ml 3-neck flask equipped with an addition funnel, temperature controller, paddle stirrer, oil bath and distilling head was charged with 200 g of a 47.7 wt % solids $ZrO_2$ dispersion. To this dispersion, 243.4 g 1-methoxy-2-propanol and 0.21 g 5 wt % Prostab 5198 (aqueous solution) were added with mixing. Next a premix of 2.4 g Gelest SIA0200.0 (95% 3-acryloxypropyltrimethoxysilane) and 46.4 Silquest A1230 was added with stirring. A coarse, inhomogeneous mixture of white solids in a clear solution formed. The premix beaker was rinsed with two aliquots of 50 g each 1-methoxy-2-propanol. The rinses were added to the batch. The batch was still inhomogeneous, so 100 g of deionized water was added to the batch. With the addition of the water, the batch became homogeneous with a bluish cast. The batch was heated to 80 deg C. and held for approximately 16 hours. The resulting mixture was a translucent dispersion with a bluish cast. The batch was cooled to room temperature.

To a 1000 ml 1-neck flask, 340 g of the above dispersion and 300 g of 1-methoxy-2-propanol were added. This mixture was distilled on a rotovap at reduced pressure (25 in Hg vacuum) to remove the water and concentrate the system. The final dispersion was a low viscosity, translucent dispersion with 56.5 wt % solids.

50/50 PEG/Acrylate Silane Surface Modified Zirconia—("50/50 PEG/Acryl")

A 2000 ml 3-neck flask equipped with an addition funnel, temperature controller, paddle stirrer, oil bath and distilling head was charged with 500 g of a 47.7 wt % solids $ZrO_2$ dispersion. Next, a premix of 0.54 g 5 wt % Prostab 5198 (aqueous solution) and 100 g deionized water was prepared in a beaker. The Prostab/water premix was added to the batch with mixing. The premix beaker was rinsed with two aliquots of 50 g each of deionized water. The rinses were added to the batch. Next 558.6 g 1-methoxy-2-propanol water added to the batch with mixing. The resultant mixture was a translucent dispersion. Next a premix of 30.1 g Gelest SIA0200.0 (95% 3-acryloxypropyltrimethoxysilane) and 64.4 Silquest A1230 was added. The premix beaker was rinsed with three aliquots of 100 g each 1-methoxy-2-propanol. The rinses were added to the batch. The batch was heated to 80 deg C. and held for approximately 16 hours. The resulting mixture was a translucent dispersion with a bluish cast. The batch was cooled to room temperature. The water was removed from the batch by alternate vacuum distillation and addition of 1000 g 1-methoxy-2-propanol. The batch was concentrated further by vacuum distillation. The final dispersion was a low viscosity, translucent dispersion with 57.8 wt % solids.

5/95 PEG/Acrylate Silane-Modified Zirconia ("5/95 PEG/Acryl")

A 2000 ml 3-neck flask equipped with an addition funnel, temperature controller, paddle stirrer, oil bath and distilling head was charged with 500 g of a 47.7 wt % solids $ZrO_2$ dispersion. To this dispersion, a premix of 200 g deionized water and 0.54 g 5 wt % Prostab 5198 (aqueous solution) was added with stirring. Next 558.6 g 1-methoxy-2-propanol was added with mixing. A premix of 57.26 g Gelest SIA0200.0 (95% 3-acryloxypropyltrimethoxysilane) and 6.44 g Silquest A1230 was then added with stirring. The batch at this stage was a translucent blue-green dispersion. The premix beaker was rinsed with three aliquots of 100 g each 1-methoxy-2-propanol. The rinses were added to the batch. The batch was heated to 80 deg C. and held for approximately 16 hours. The resulting mixture was a homogeneous, opaque-white dispersion. The batch was cooled to room temperature. The water was removed from the batch by alternate vacuum distillation and addition of 1000 g 1-methoxy-2-propanol. The batch was concentrated further by vacuum distillation. The final dispersion was a low viscosity, translucent dispersion with 59.3 wt-% solids.

Surface Modified Titania ("Ti")

9.1 grams of Titanium isopropoxide (Aldrich Chemical Company, Milwaukee, Wis.), 6.8 grams of Gelest SIA0200.0 (95% 3-acryloxypropyltrimethoxysilane), and 2.3 grams of 3-glycidoxy propyl trimethoxysilane (Aldrich Chemical Company, Milwaukee, Wis.) were dissolved in 73 grams of 1-methoxy-2-propanol (Aldrich Chemical Company, Milwaukee, Wis.). This mixture was rapidly stirred while a mixture of 0.35 grams concentrated HCl (Aldrich Chemical Company, Milwaukee, Wis.), 2.2 grams deionized water and 6.25 grams of 1-methoxy-2-propanol (Aldrich Chemical Company, Milwaukee, Wis.) was slowly added. After this addition was complete, the mixture was rapidly stirred and heated to 70 C for one hour.

Fluoroacrylate Polymer Intermediate 1

A hyperbranched copolymer was made as follows. 6.5 grams of C6DIACRY, 4.2 grams of CN4000, 0.42 grams of SR399, 87.8 grams of ethyl acetate, and 1.11 grams of Vazo 52 pre-dissolved in the ethyl acetate were charged into a reaction vessel. The contents of the reaction vessel were degassed under nitrogen, and then heated 80° C. in a sealed bottle for 1 to 1.5 hours. Care must be taken to avoid building an excessive molecular weight and gelling the reaction contents. The concentration of the reactive species in the reaction mixture, the temperature of the reaction, and the reaction time were all selected to ensure this result, and one or more of these would need to be adjusted if different reactive species were used.

Fluoroacrylate Polymer Intermediates 2-13 were made in a similar manner as 1

The samples were made by combining all ingredients depicted in Table 1 as follows in a vial, purging with nitrogen for 1 minute and then heating the sealed vial at 80° C. for one hour.

TABLE 1

Fluoroacrylate Polymeric Intermediates -
wt-% solids of components

| FPA | C6DIACRYL | CN 4000 | Et. Acet. | Vazo 52 | Non-fluorinated (meth)acrylate crosslinker |
|---|---|---|---|---|---|
| 1 | 6.5 | 4.2 | 87.8 | 1.11 | SR399 - 0.42 |
| 2 | 8.0 | 2.8 | 88.3 | 0.56 | SR399 - 0.34 |
| 3 | 8.7 | 2.4 | 88.3 | 0.61 | |
| 4 | 0 | 6.7 | 88.27 | 0.73 | SR247 - 4.3 |
| 5 | 8.8 | 2.5 | 85.7 | 3.0 | |
| 6 | 10 | 1.25 | 87.5 | 1.25 | |
| 7 | 9.8 | 1.23 | 85.8 | 3.07 | |
| 8 | 10 | 1.25 | 86.9 | 1.25 | SR399 - 0.6 |
| 9 | 9.8 | 1.22 | 85.5 | 3.1 | OFPMA - 0 |
| 10 | 7.35 | 1.22 | 85.5 | 3.1 | OFPMA - 2.45 |
| 11 | 4.9 | 1.22 | 85.5 | 3.1 | OFPMA - 4.9 |
| 12 | 2.45 | 1.22 | 85.5 | 3.1 | OFPMA - 7.35 |
| 13 | 0 | 1.22 | 85.5 | 3.1 | OFPMA - 9.8 |

Coatings of the AR Formulation

These were performed by using wire-wound coating rods (Mayer rods). When using wire rods, solution was diluted to 6 percent total solids using 50/50 MEK/cyclohexanone. Standard techniques known in the coating art were employed. The solution was coated with a #5 Mayer on the primed surface of a 5 mil PET film (obtained from Dupont, Melinex 618). The coatings were air dried at 90° C. for 2 minutes. The coatings were then photocured at 100% power, at 15 fpm, under nitrogen, using the Light Hammer 6 previously described.

TABLE 2

Self-Assembling AR Coating Compositions
(Component-Wt-% solids)

| AR Comp. | FPA*-Wt-% Solids | Surface Modified Zirconia | Irganox 127 | Non-fluorinated (meth)acrylate crosslinker |
|---|---|---|---|---|
| 1 | 1-33.3 | Methacryl-40 | 3.3 | SR 399-23.3 |
| 2 | 1-33.3 | 5/95 PEG/acryl-40 | 3.3 | SR 399-23.3 |
| 3 | 1-33.3 | 50/50 PEG/acryl-40 | 3.3 | SR 399-23.3 |
| 4 | 1-30 | 50/50 PEG/acryl-43.2 | 3.9 | SR 355-22.9 |
| 5 | 1-30 | 50/50 PEG/acryl-43.2 | 3.9 | SR 368-22.9 |
| 6 | 1-30 | 50/50 PEG/acryl-43.2 | 3.9 | Ebecryl 220-22.9 |
| 7 | 2-33.2 | 50/50 PEG/acryl-43.1 | 3.8 | Ebecryl 8301-19.9 |
| 8 | 3-36.4 | 50/50 PEG/acryl-43 | 4.0 | CN 997-16.6 |
| 9 | 4-34.2 | 50/50 PEG/acryl-34.2; 90/10 PEG/acryl-10.3 | 4.1 | CN997-17.1 |
| 10 | 5-38.3 | Ti-42 | 3.0 | SR 399-16.7 |
| 11 | 6-39.5 | 50/50 PEG/acryl-22; 90/10 PEG/acryl-7.7 | 3.3 | SR 399-27.5 |
| 12 | 7-39.5 | 50/50 PEG/acryl-22; 90/10 PEG/acryl-7.7 | 3.3 | SR 399-27.5 |
| 13 | 8-39.5 | 50/50 PEG/acryl-22; 90/10 PEG/acryl-7.7 | 3.3 | SR 399-27.5 |
| 14 | 9-39.5 | 50/50 PEG/acryl-22; 90/10 PEG/acryl-7.7 | 3.3 | SR 399-27.5 |
| 15 | 10-39.5 | 50/50 PEG/acryl-22; 90/10 PEG/acryl-7.7 | 3.3 | SR 399-27.5 |
| 16 | 11-39.5 | 50/50 PEG/acryl-22; 90/10 PEG/acryl-7.7 | 3.3 | SR 399-27.5 |
| 17 | 12-39.5 | 50/50 PEG/acryl-22; 90/10 PEG/acryl-7.7 | 3.3 | SR 399-27.5 |
| 18 | 13-39.5 | 50/50 PEG/acryl-22; 90/10 PEG/acryl-7.7 | 3.3 | SR 399-27.5 |

*no. of fluoroacrylate polymer (FPA) from Table 1

Testing Methods for Evaluating AR Films

Reflection was measured using a Lambda 900 spectrophotometer (Perkin Elmer Life And Analytical Sciences, Inc. Waltham, Mass.) in reflection mode from 450 to 650 nm. This instrument measures the reflection of an area of about 1 cm². The reflection curve was plotted and the wavelength that the reflection was a minimum was recorded.

Haze was measured using a Lambda 900 at 450 nm in transmission mode with the rear reflector removed.

Viscosity of the FPA solution was measured using a Brookfield model DV-111 rheometer (Brookfield Engineering Lab, Stoughton, Mass.). A #18 spindle was used at 20 rpm. The solutions were at 14.5% solids in ethyl acetate.

X-Ray Photoelectron Spectroscopy

The surface of the AR film prepared from self-assembling composition no. 7 of Table 2 was examined using x-ray photoelectron spectroscopy (XPS or ESCA). ESCA is a non-destructive technique which provides an analysis of the outermost 30 to 100 Å on the specimen surface. The photoelectron spectra taken using ESCA provide information about the elemental and chemical (oxidation state and/or functional group) concentrations present on a solid surface. It is sensitive to all elements in the periodic table except hydrogen and helium with detection limits for most species in the 0.1 to 1 atomic % concentration range.

The surface of the sample was sputter etched using an ion beam consisting of $C_{60}^+$ ions at beam energy of 10 KeV. When ions of this type strike a polymeric surface, the etching process removes material from the surface in a well-controlled manner with low (or no) chemical damage to the freshly exposed sample. By sequentially etching for a fixed period of time, and then recording ESCA spectra, a "Depth Profile" can be generated with high depth (z-axis) resolution. Because ESCA is a quantitative surface analysis technique, the ordinate on the Depth Profile is Concentration in Atomic %.

The analysis conditions and details were as follows:

| | |
|---|---|
| ESCA Instrumentation: | All spectra were taken using a Kratos Axis Ultra ™ ESCA system which utilizes a monochromatic AlK$_\alpha$ x-ray excitation source and a hemispherical electron energy analyzer operated in a constant pass energy mode. |
| Analysis Area: | ≈ 700 × 1000 μ |
| Photoelectron Take Off Angle: | 90° measured with respect to the sample surface with a ± 10° solid angle of acceptance. |
| X-Ray Source: | Monochromatic Al K$_\alpha$ [1487 eV] |
| Power To Anode: | 210 Watt |
| Neutralizer Voltage: | 2.0 eV |
| Chamber Pressure During Analysis: | $1 \times 10^{-8}$ Torr |
| Data Processing: | Quantitation was accomplished using standard Vision2™ software provided by Kratos and CASAXPS™ ESCA Data Reduction Software. |
| $C_{60}$ Ion Gun: | PHI Model ER 04-099-A1 C60 Ion Gun Operated in a Differentially Pumped Mode |
| $C_{60}$ Source Operating Temperature: | 430° C. |
| $C_{60}$ Source Operating Pressure: | $6 \times 10^{-9}$ Torr [Measured at Differential Pumping Line] |
| Beam Energy: | 10 KeV |
| Raster Size: | 1.5 × 1.5 mm |
| Beam Current: | 25 nA [Measured on Cu Foil] |
| Approximate Etch (Removal) Rate: | 10 nm/min of etch time |
| Incidence Angle: | 20° wrt Sample Surface |

The results are depicted in the graph of FIG. 4.

Transmission Electron Microscopy

Thin cross-sections of the AR film prepared from self-assembling composition no. 14 of Table 2 were prepared using a Diatome 45 degree room temperature diamond knife and a Leica Ultracut T ultramicrotome. The sample was mounted in a clamp mount and sections approximately 150 nm thick were dry cut and sections approximately 100 nm thick were wet cut (floated onto water) at cutting speeds of 0.15 mm/sec and 0.6 mm/sec respectively. The sections were picked up on standard TEM grids: 200 mesh Cu grids with carbon/formvar substrates. The microscopy was performed in a Hitachi H9000 NAR transmission electron microscope at 300 KV accelerating voltage. Digital images were taken in the microscope using a Gatan Utrascan 895 CCD camera. Two different cross-section are depicted in FIGS. 5-6.

TABLE 3

AR Film Test Results

| AR Composition | Min. reflection | Min. wavelength | Haze | Viscosity of FPA (cps) |
|---|---|---|---|---|
| 1 | 2.2 | 630 | 1.3 | |
| 2 | 1.9 | 620 | 3.2 | |
| 3 | 1.3 | 590 | 0.8 | |
| 4 | 1.2 | 500 | 0.8 | |
| 5 | 1.2 | 520 | 0.8 | |
| 6 | 1.2 | 490 | 0.8 | |
| 7 | 0.8 | 570 | 0.6 | |
| 8 | 0.6 | 600 | 0.52 | |
| 9 | 0.8 | 560 | 0.53 | |
| 10 | 1.1 | 570 | 0.5 | |
| 11 | 1.5 | 490 | 0.86 | 3.2 |
| 12 | 1.7 | 550 | 0.86 | 6.3 |
| 13 | 2.3 | 550 | 1.3 | 8.3 |
| 14 | 1.4 | 510 | 0.82 | 2.4 |
| 15 | 1.5 | 490 | 0.82 | 2.1 |
| 16 | 2.2 | 500 | 1.67 | 2.0 |
| 17 | 2.9 | 490 | 2.8 | 1.5 |
| 18 | 3.4 | 490 | 2.1 | 1.2 |

Examples 1-6 demonstrate that a combination of an acryl silane surface treatment with a polyether surface treatment provides improved reflection properties and reduced haze in a variety of non-fluorinated (meth)acrylate crosslinkers. Example 10 demonstrates the use of sol gel derived nanoparticles as well as the utility of an epoxy silane surface treatment. Examples 7-10 exhibit good antireflection properties in combination with low haze.

Examples 11-18 demonstrate that poorer antireflection properties and higher haze can result when the solution viscosity of the fluoroacrylate polymer is about 8 cps and greater or the solution viscosity of the fluoroacrylate polymer is 2 cps and lower.

What is claimed is:

1. A self-assembling antireflective coating composition comprising
    a solvent;
    a low refractive index organic composition having a refractive index of less than 1.5;
    at least 15 wt-% of inorganic nanoparticles having a refractive index of at least 1.6 wherein the inorganic nanoparticles are surface modified with a surface treatment having a surface tension greater than the surface tension of the organic composition.

2. The AR coating composition of claim 1 wherein the surface treatment has a surface tension of at least 5 dynes/cm greater than the low refractive index organic composition.

3. The AR coating composition of claim 1 wherein the surface treatment comprises an organometallic compound or mixture thereof, wherein the compound or mixture has a surface tension of at least 25 dynes/cm.

4. The AR coating composition of claim 3 wherein the organometallic compound or mixture thereof is non-fluorinated.

5. The AR coating composition of claim 4 wherein the surface treatment comprises a mixture of a (meth)acryl silane with a polyether silane or epoxy silane.

6. The AR coating composition of claim 1 wherein the low refractive index organic composition comprises an ethylenically unsaturated fluorinated monomer, oligomer, polymer, or mixture thereof.

7. The AR coating composition of claim 6 wherein the low refractive index organic composition comprises an ethylenically unsaturated fluorinated polymer.

8. The AR coating composition of claim 7 wherein the fluorinated polymer is a fluoro (meth)acrylate polymer.

9. The AR coating composition of claim 8 wherein the fluoro(meth)acrylate polymer has a solution viscosity ranging from about 2 cps to about 8 cps for a 14.5 wt-% solids solution in ethyl acetate at 22° C.

10. The AR coating composition of claim 8 wherein the fluoro(meth)acrylate polymer is present at a concentration of at least about 10 wt-% solids of the dried coating composition.

11. The AR coating composition of claim 8 wherein the fluoro(meth)acrylate polymer comprises the reaction product of
    i) at least one multi-functional free-radically polymerizable material having a fluorine content of at least about 25 wt-%, and
    ii) optionally at least one multi-functional free-radically polymerizable material having a fluorine content ranging from 0 to less than 25 wt-%,
wherein the total amount of multi-functional materials is at least 25 wt-% based on wt-% solids.

12. The AR coating composition of claim 1 wherein the low refractive index organic composition further comprises at least 10 wt-% of a non-fluorinated crosslinker comprising at least three (meth)acrylate groups.

13. The AR coating composition of claim 1 wherein the solvent is a non-fluorinated organic solvent.

* * * * *

UNITED STATES PATENT AND TRADEMARK OFFICE
CERTIFICATE OF CORRECTION

PATENT NO.       : 8,202,573 B2
APPLICATION NO.  : 12/670124
DATED            : June 19, 2012
INVENTOR(S)      : Richard J Pokorny It is certified that error appears in the above-identified patent and that said Letters Patent is hereby corrected as shown below:

IN THE SPECIFICATIONS:

Column 4
Line 20, Delete "creamer" and insert -- ceramic --, therefor.

Column 7
Line 62, Delete "Collodial" and insert -- Colloidal --, therefor.

Column 8
Line 60, Delete "$CH_2=C(CH_3)_mM(OR)$ or" and insert -- $CH_2=C(CH_3)_mM(OR)_n$ or --, therefor.

Column 9
Line 28, Delete "dependant" and insert -- dependent --, therefor.

Column 10
Line 3-4, Delete "hyberbranched" and insert -- hyperbranched --, therefor.
Line 25-26, Delete "macrogellation" and insert -- macrogelation --, therefor.
Line 29-30, Delete "macrogellation" and insert -- macrogelation --, therefor.

Column 11
Line 48, Delete ""Ebecry" and insert -- "Ebecryl --, therefor.
Line 48, Delete ""Ebecry" and insert -- "Ebecryl --, therefor.

Column 19
Line 20, Delete "(ZrO2-" and insert -- ($ZrO_2$- --, therefor.

Column 23
Line 11, Delete "Utrascan" and insert -- Ultrascan --, therefor.

Signed and Sealed this
Ninth Day of October, 2012

David J. Kappos
*Director of the United States Patent and Trademark Office*